United States Patent [19]

Wilson

[11] 4,049,119
[45] Sept. 20, 1977

[54] TAPE CASSETTE FILING UNIT

[75] Inventor: Robert B. Wilson, Holyoke, Mass.

[73] Assignee: National Blank Book Company, Inc., Holyoke, Mass.

[21] Appl. No.: 687,154

[22] Filed: May 17, 1976

[51] Int. Cl.² .................. B65D 85/672; B65D 85/67; B65D 25/02
[52] U.S. Cl. .............................. 206/387; 206/408; 206/472
[58] Field of Search ...................... 206/387, 408, 472

[56] References Cited

U.S. PATENT DOCUMENTS 3,604,556  9/1971  Schwartz .......................... 206/387
3,896,929  7/1975  Mills ................................. 206/387

Primary Examiner—William T. Dixson, Jr.
Attorney, Agent, or Firm—Chapin, Neal and Dempsey

[57] ABSTRACT

Filing unit for the storage of recording tape cassettes in which one or more loose leaf pages or sheets are insertable in a loose leaf ring binder. Each sheet has a plurality of retainer clips affixed thereto. The clips are formed from a strip of resilient material with a base portion and upwardly extending post portions spaced apart a distance approximately equal to the reel spacing of the cassettes to be held thereby. Each post extends generally perpendicularly from the base and includes an upwardly opening slot defining two spring finger portions, each having an outwardly extending lug at its upper edge to snugly engage the wall within the reel opening of the cassette.

4 Claims, 4 Drawing Figures

TAPE CASSETTE FILING UNIT

BACKGROUND

As an adjunct to the tremendous commercial success of recording tape cassettes in recent years, there has been widespread activity in developing and marketing storage and index units for these cassettes. Many of the units heretofore available have not found wide acceptance for various reasons, including relative cost factors and generally cumbersome size, particularly in relation to the small size of the cassettes themselves. The tape cassette filing unit embodying this invention overcomes the drawbacks of the currently available cassette storage systems.

The principal object of this invention is to provide a versatile, economical and efficient tape cassette filing unit.

It is another object of this invention to provide a tape cassette filing unit of simple but effective construction, which may be used in combination with a loose leaf binder and in which cassettes may be readily inserted and removed individually or in groups of two or more carried on a loose leaf support sheet.

The above and other objects and advantages of this invention will be more readily apparent from the following description and with reference to the accompanying drawings, in which.

Figure 1:
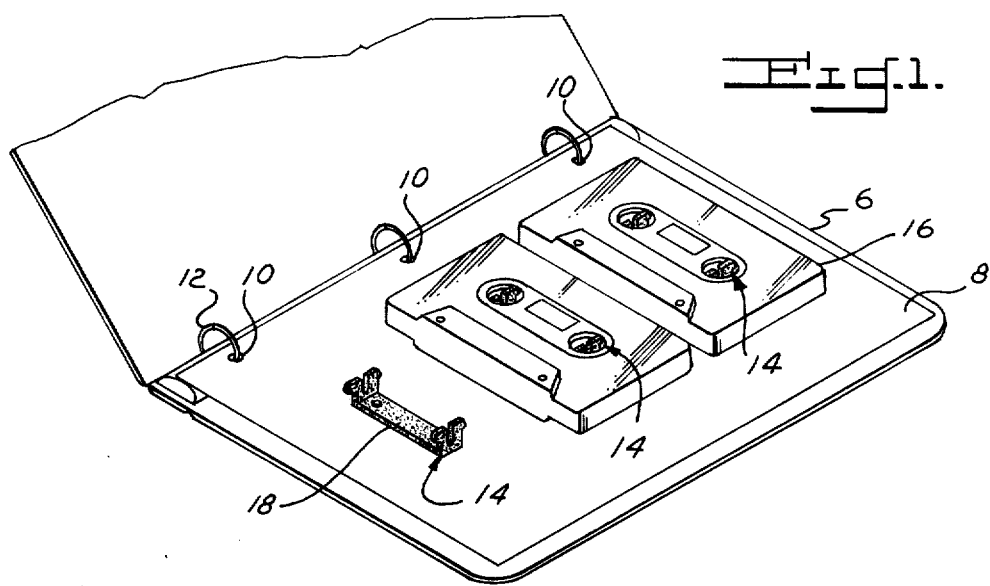
FIG. 1 is a partial perspective view showing a tape cassette filing unit embodying this invention.
Figure 2:
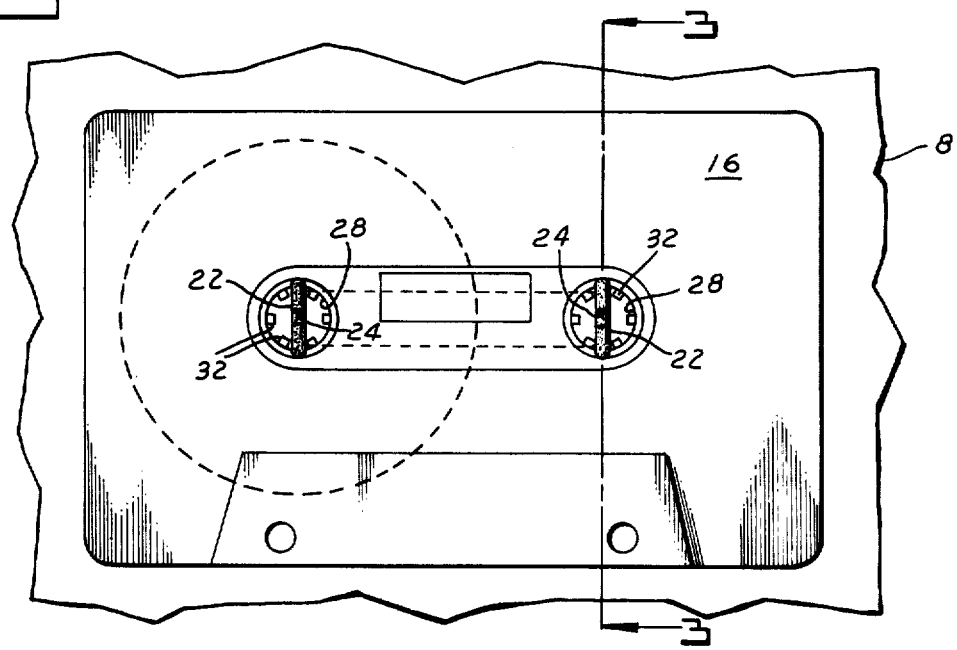
FIG. 2 is an enlarged plan view of a portion of the tape cassette filing unit of FIG. 1.

Referring in detail to the drawing, in FIG. 1 a ring binder of any conventional type is shown generally at 6. Secured within the ring binder is a base support or sheet 8 of any suitable material, such as paper board, plastic or the like having three spaced perforations 10 disposed along one of the side edges thereof. As shown, the holes of sheet 8 are arranged for registry with rings 12 of the binder. A plurality of cassette retainer clips 14 are affixed to the sheet 8 in parallel spaced relation. Each clip is adapted to receive and retain one tape recording cassette of standard size as illustrated at 16.

Figures 3, 4:
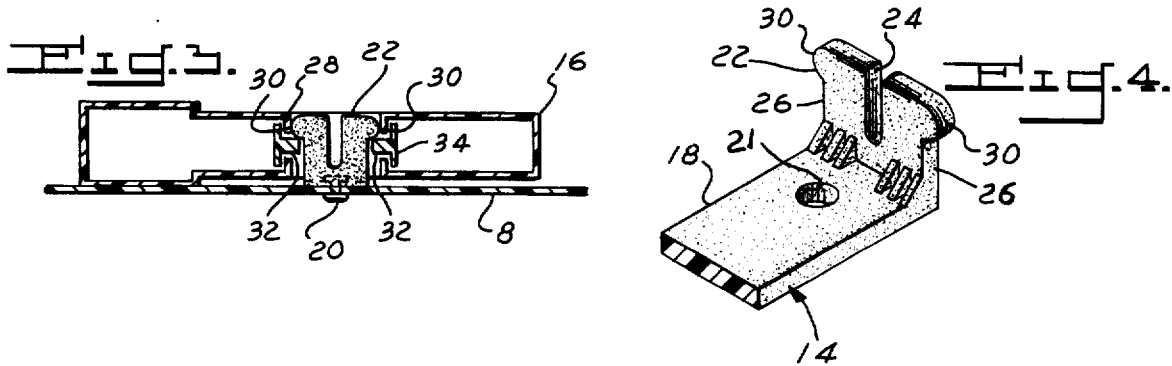
FIG. 3 is a sectional view taken along line 3—3 of FIG. 2.
FIG. 4 is an enlarged perspective view illustrating the constructional details of a retainer clip portion of the tape cassette unit.

Retainer clip 14 is formed of a strip of flexible resilient material such as any suitable spring metal or synthetic plastic material. Each clip includes a generally flat base portion 18 which may be attached to the sheet 8 by any suitable means, such as rivets 20 (FIG. 3) which are fitted through holes 21 through the base 18, whereby, as shown, the base of the clip is held in surface-to-surface contact with sheet 8. In the embodiment shown, three such clips extend in parallel spaced relation from top to bottom of the sheet 8. Extending vertically upward from the outer ends of base 18, the clips each include generally flat post portions 22. An upwardly opening "U-shaped" slot or notch 24 separates the upper end portion of the post into a bifurcated construction of two laterally spaced finger portions 26 capable of flexure toward each other when the spools of a cassette are fitted onto the posts. Extending outwardly from the upper outer edge of each of the fingers 26 is a projecting lug 30 adapted to engage the inner peripheral wall of the generally cylindrical bores 28 of the cassette. The thickness of clips 14 is such that the upstanding posts 22 will fit between adjacent pairs of the tape tracking teeth or lugs 32 formed on the reels 34 of the cassette. Thus, when a cassette is fitted onto a spring clip 14, the flat post portions thereof will pass between the tracking lugs or teeth 32 and the lugs 30 engage diametrically opposite surface portions of peripheral wall 28 (FIG. 3) at locations above the spool 34 so that the cassette will be firmly held in place on the sheet 8. The fit is such that the finger portions 26 of the retainer clips are flexed slightly together thereby being tensioned to exert a spring-like gripping action of "snap fit" on the cassette. A positive manual lifting force is all that is required for removal of the cassette from the spring fingers 26 which will be flexed inwardly to release the cassette.

Not only do the clips hold the cassettes in place on the base sheet 8, but also the unique arrangement positively prevents spool rotation so long as the cassettes are stored thereon. In this way undesirable winding and unwinding of the tapes is no longer a problem.

While only a single base sheet 8 is shown in the binder, it will be appreciated that the combination ring binder and cassette mounting sheet is uniquely adapted for the storage of a plurality of base sheets each capable of holding a plurality of individual cassettes.

Moreover, the cassette carrying sheets or pages can be easily classified or indexed by imprinting appropriate identifying data directly on the sheet adjacent the cassette mounting location. Furthermore, a sheet bearing three cassettes may be removed from one binder and transferred as a unit to any desired location separate from the ring binder. If desired, a cassette carrying sheet may also readily be filed in a new or different ring binder such as when a tape collector desires to refile or reclassify his collection.

Having thus disclosed the invention, what is claimed is:

1. Filing unit for tape cassettes comprising a base sheet, at least one cassette retainer clip affixed to the surface of said sheet, said clip including a base and upwardly extending post portions, said post portions being spaced apart a distance approximately equal to the spacing between reels of said tape cassette, each of said post portions including outwardly extending lugs to engage the inner surface of the reel opening of said cassette.

2. Filing unit as set forth in claim 1 in which each of said clips is formed of a strip of resilient material in which each of said post portions thereof is divided into laterally spaced finger portions by an upwardly opening slot, said lugs extending from the upper outer edge portion of said finger portions.

3. Filing unit as set forth in claim 2 in which said posts are of generally planar construction having a thickness less than the spacing between the tracking lugs formed on the reels of said cassette.

4. In combination with a loose leaf ring binder for use in storing tape cassettes, a loose leaf sheet having perforations along one edge disposed to fit onto the rings of said binder for removably inserting said sheet into the ring binder, a plurality of integral retainer clips affixed to one surface of said sheet, said clips being disposed in spaced parallel relationship on one surface of said sheet, said clips being formed from strips of resilient material and including a generally flat base portion and upwardly extending posts, said posts including an upwardly opening slot defining laterally spaced finger portions each having a lug extending outwardly from its upper outer edge, said posts being generally of planar configuration and having a thickness less than the spacing between adjacent pairs of reel lugs of said cassettes.

* * * * *